United States Patent [19]

Piazza

[11] 4,123,212
[45] Oct. 31, 1978

[54] APPARATUS FOR UNIFORMLY DISTRIBUTING GLASS FIBERS

[75] Inventor: Matthew R. Piazza, Nichols, Conn.

[73] Assignee: Maso-Therm Corporation, Bridgeport, Conn.

[21] Appl. No.: 810,451

[22] Filed: Jun. 27, 1977

[51] Int. Cl.² .............................................. B29D 7/08
[52] U.S. Cl. ................................. 425/82.1; 425/83.1; 425/224; 264/112
[58] Field of Search ................................... 425/80–83, 425/223, 224, DIG. 201, 371, 369; 264/112

[56] References Cited

U.S. PATENT DOCUMENTS

| | | | |
|---|---|---|---|
| 2,317,895 | 4/1943 | Drill | 425/83.1 X |
| 2,331,145 | 10/1943 | Slayter | 425/83.1 X |
| 2,702,069 | 2/1955 | Lannan | 425/82.1 X |
| 2,711,381 | 6/1955 | Novotny et al. | 425/82.1 X |
| 2,847,701 | 8/1958 | Welch | 425/80.1 |
| 2,969,301 | 1/1961 | Finger | 425/82.1 X |
| 3,044,111 | 7/1962 | Caughey | 425/371 X |
| 3,071,180 | 1/1963 | Finger et al. | 425/369 X |
| 3,150,025 | 9/1964 | Slayter et al. | 425/82.1 |

*Primary Examiner*—Robert L. Spicer, Jr.
*Attorney, Agent, or Firm*—Burgess, Dinklage & Sprung

[57] ABSTRACT

A process and an apparatus for substantially uniformly distributing glass fibers onto a forming bed. The apparatus is mounted above the bed for movement relative thereto along the length of the bed and is receptive of glass fibers for chopping same into desired lengths. A hood structure is downstream of the chopping and comprises three chambers. A first chamber defining a receiving zone in the process receives the chopped glass fibers which are dropped into the hood and a second chamber defining a dispersing zone is in communication with the first chamber and downstream thereof and disperses the glass fibers received from the first chamber to effect a random uniform matrix thereof along the width of the bed. The dispersion is carried out by a turbulence that is created within the chamber. The third chamber defining a distributing zone is disposed downstream of the second chamber and has an adjustable length elongated outlet aperture which extends across a desired width of the bed. The third chamber receives the dispersed glass fibers in the random uniform matrix and substantially isolates the fibers therein from the turbulence in the second chamber for substantially uniformly distributing the glass fibers therein on the desired width of the bed by dropping same through the aperture during relative movement of the apparatus along the length of the bed.

5 Claims, 3 Drawing Figures

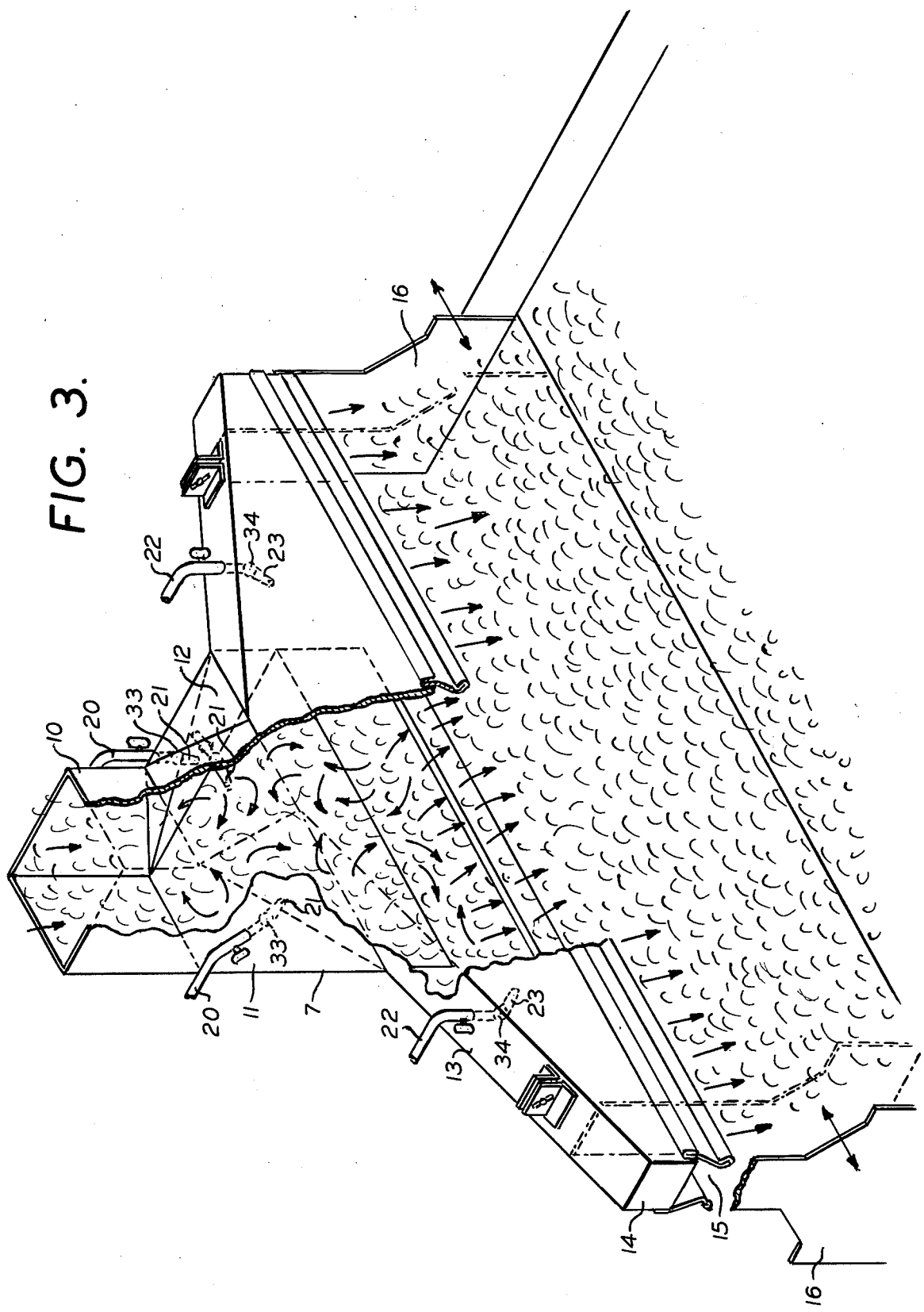

APPARATUS FOR UNIFORMLY DISTRIBUTING GLASS FIBERS

BACKGROUND

The present invention relates to a process and an apparatus for uniformly distributing glass fibers onto a forming bed.

Apparatus and processes are known in the prior art for distributing glass fibers onto a forming bed of wet cementitious material, but these have many disadvantages owing to their method of distributing.

Glass fiber reinforcement can be incorporated into cementitious material in an interconnected random matrix by pre-mixing. However, in the pre-mixing method the physical act of pre-mixing tends to break down the matrix of the fibers thereby reducing the reinforcement of the overall cement product.

Another prior art method of dispersing the glass fibers utilizes a hand chopper and a hand sprayer for spraying the glass fibers onto a bed of cementitious material. This system also has the disadvantage of breaking down the fiber matrix and additionally has the disadvantage of not giving a uniform distribution of the glass fiber over a large bed area. Since this system is carried out by hand, it also has the disadvantage of not permitting an efficient way of handling the glass fiber reinforcement of materials on an assembly line basis.

A further known method utilizes the hand spraying of a mixture of glass and cement. Like other previous known methods, this system also breaks down the matrix of the fibers and also does not permit a uniform distribution of glass fibers nor is it convenient to use in a large scale operation.

In the glass fiber reinforcement of cementitious material, it is preferable to use as long a fiber as possible in order to provide greater reinforcement. In the known methods of distribution, the fibers must be short in order to carry out these methods and it is unusual for the fibers to be any longer than one inch in length. And thus this presents a distinct limitation to these types of distribution.

SUMMARY OF THE INVENTION

It is the main object of the present invention to provide an apparatus and a process which eliminate the disadvantages of the prior art apparatus and processes and which substantially uniformly distribute glass fibers onto a forming bed.

Another object of the present invention is to provide an apparatus and process which can utilize long fiber lengths and which will effect a distribution of a random uniform matrix of glass fibers on the forming bed.

A further object of the present invention is to provide an apparatus and a process which can uniformly distribute the glass fibers on a large scale assembly line basis for mass producing reinforced cement modules.

These and other objects of the present invention are achieved by the apparatus for substantially uniformly distributing glass fibers onto a forming bed, comprising means for mounting the apparatus above the bed for movement relative thereto along the length of the bed, and means receptive of glass fibers for chopping same into desired lengths. Also provided is hood means downstream of the chopping means and receptive of glass fibers dropped therein comprising means defining a first chamber for receiving the chopped glass fibers dropped into the hood mean, means defining a second chamber in communication with the first chamber and downstream thereof for dispersing the glass fibers received from the first chamber to effect a random uniform matrix thereof along the width of the bed and means defining a third chamber receptive of the dispersed glass fibers in the random uniform matrix for substantially uniformly distributing the glass fibers therein on the desired width of the bed by dropping same through an aperture therein during relative movement of the apparatus along the length of the bed. The second chamber includes means for creating a turbulence therein including air spray nozzles disposed in the second chamber and receptive of a source of pressurized air for spraying generally downwardly into the second chamber. The chamber has an elongated adjustable length outlet aperture which extends across a desired length of the bed and is disposed downstream of the second chamber and the third chamber substantially isolates the fibers threin from the turbulence in the second chamber whereby the uniform distribution is effected.

The process comprises the steps of chopping glass fibers into desired lengths and providing a first receiving zone downstream of the chopping and dropping the chopped fibers therein. A second dispersing zone is provided in communication with the first zone and downstream thereof and the glass fibers received from the first zone are dispersed therein to effect a random uniform matrix thereof along the width of the bed by creating a turbulence therein. The fibers in the random uniform matrix are substantially isolated from the turbulence in the second zone by providing a third zone having an adjustable length elongated outlet aperture extending across a desired width of the bed and disposed downstream of the second zone and receptive of the dispersed glass fibers in the random uniform matrix. The glass fibers are substantially uniformly distributed in the third zone on the desired width of the bed by dropping same through the aperture and moving the third zone relative to the bed along the length thereof.

BRIEF DESCRIPTION OF THE DRAWINGS

FIG. 3 is a partially cut away perspective view of the hood shown in FIGS. 1 and 2.

DETAILED DESCRIPTION OF THE PREFERRED EMBODIMENTS

Figure 1:
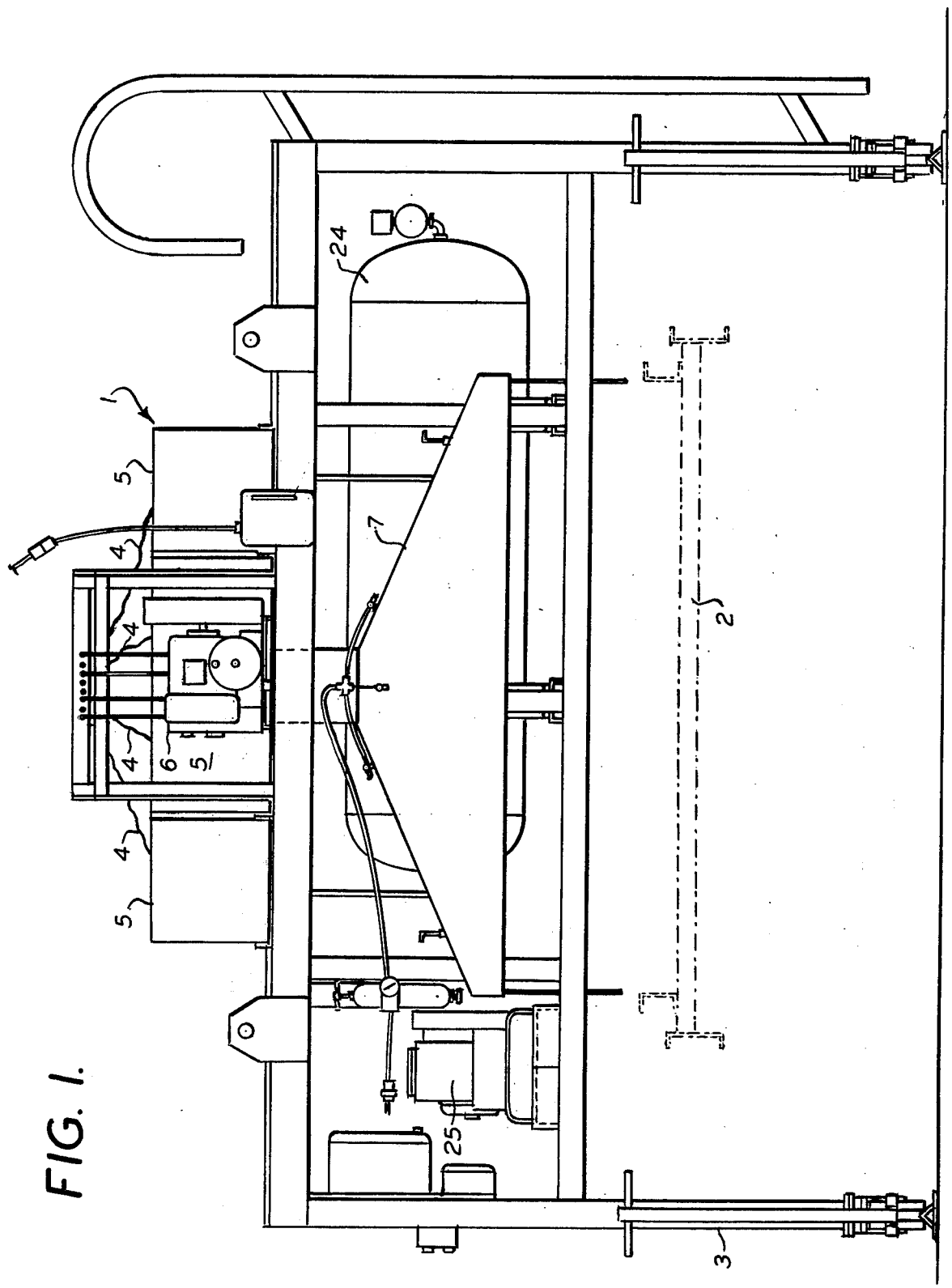
FIG. 1 is a front plan view of the apparatus of the present invention.

Referring now to FIG. 1, the distributing apparatus 1 is mounted by a suitable structure 3 over a forming bed 2 which is shown in dotted lines since it is not part of the apparatus.

Figure 2:
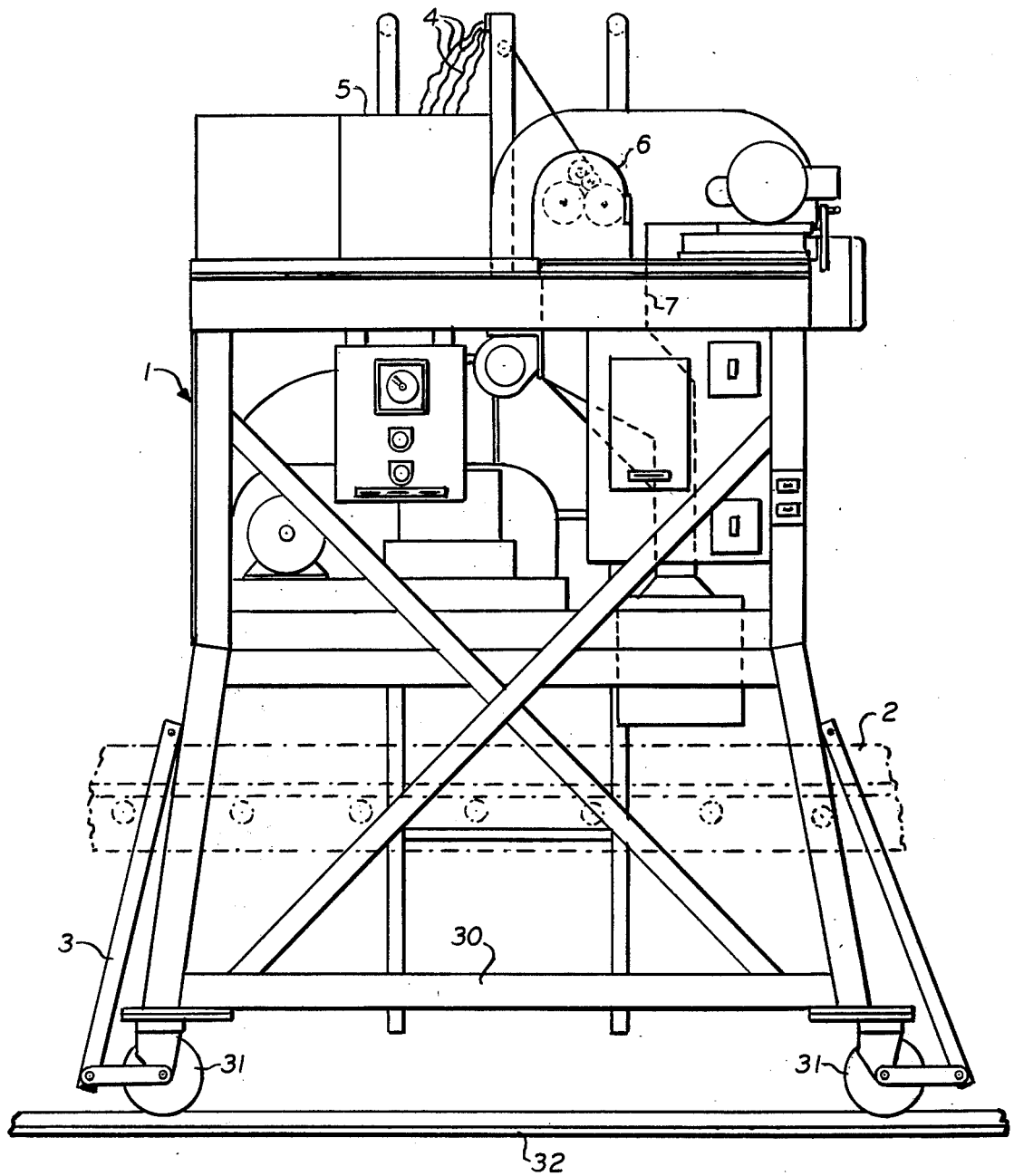
FIG. 2 is a side plan view of the apparatus of the present invention shown in FIG. 1.

As shown in FIG. 2, support structure 3 may be any suitable support 30 traveling on wheels 31 on a track 32 so that the apparatus 1 moves relative to the bed 2 along the length thereof. It is also within the scope of the invention that the apparatus 1 could be fixed and the bed 2 moves relative to the apparatus 1 and along the length of the bed 2.

The apparatus 1 further comprises a chopper 6 which is receptive of glass fibers 4 in long lengths from source 5 which can be disposed on the apparatus. The chopper 6 can be any conventional chopper which chops the fibers into desired lengths which are suitable for the material to be reinforced.

The chopper drops the chopped fibers into the dispersing and distributing hood 7 which then drops the dispersed glass fibers in a random uniform matrix substantially uniformly onto forming bed 2. Forming bed 2 may have a layer of cementitious material thereon or no material may be disposed thereon as it may be desired to distribute the fibrous reinforcing material on the bed before the cementitious material is first layed down.

In a typical usage of the apparatus, the steps of depositing the mixture of wet cementitious material and depositing the fibrous reinforcing material are carried out successively by depositing fibers and then wet cement material. The steps of depositing fibers and then wet cement material can be interchanged and repeated as many times as desired. Additionally, it may be desirable to provide means for vibrating the bed 2 during the process in order to obtain a good distribution of the fibers within the cementitious material.

FIG. 3 shows in greater detail the dispersing and distributing hood 7 of FIGS. 1 and 2. As shown, the chopped fibers are dropped into chamber 10 which defines a receiving zone and by the force of gravity fall into chamber 11 which defines a dispersing zone downstream of the chamber 10 for dispersing the glass fibers received therefrom to effect a random uniform matrix of the glass fibers. Chamber 10 has a reduced cross section and chamber 11 serves to disperse the glass fibers along a greater width corresponding to that of the bed 2.

This dispersion is carried out in chamber 11 in the two portions thereof 12 and 13. Chamber portion 12 receives the fibers from chamber 10 and has spray nozzles 21 aimed generally downward therein and receptive of compressed air along hoses 20 from tank 24 and compressor 25 shown in FIG. 1. Spray nozzles 21 create a turbulence in this portion of chamber 11 as shown in the figure by the arrows showing air movement. Portion 13 of chamber 11 is trapezoidal in shape with the shorter base being upstream of the longer base. Portion 13 also has spray nozzles 23 extending generally downward and receptive of pressurized air through hoses 22 from the tank and compressor. In chamber 11, the fibers are dispersed so that they uniformly enter chamber 14 which defines a distributing zone and which extends across the width of the bed. Chamber 14 substantially isolates the fibers therein from the turbulence in chamber 11 as shown by the arrows in FIG. 3 and the fibers are substantially uniformly distributed on a desired width of the bed by being dropped through the aperture 15. Therefore chamber 11 not only disperses the fibers to maintain them in a random uniform matrix, but spreads the fibers out uniformly from the cross section of the portion 12 which has a width substantially greater than that of the outlet aperture 15 and a length substantially smaller than that of the outlet aperture 15 and obtains this uniform distribution by the time it reaches the bottom of portion 13 thereof by means of the shape and the turbulence in portions 12 and 13.

By utilizing members 16, outlet aperture 15 can be made adjustable in length so that a desired width of the forming bed can be covered by the apertures. Members 16 are movable along the length of aperture 15, as shown in phantom lines, in order to adjustably direct the emerging fibers to the desired length.

Spray nozzles 21 and 23 are also mountable on swivel joints 33 and 34 respectively. This swivel mounting enables the direction of the air spray nozzles to be adjusted thereby permitting adjustment of the turbulence to obtain the desired degree of turbulence within chamber 11.

The fibrous reinforcement in fiber form is preferably glass fiber chopped from rovings in lengths of one quarter to three inches and preferably from one to two inches. A preferred glass fiber is AR(alkali resistant) glass fiber sold under the trademark CEM-FIL and more particularly described in U.S. Pat. No. 3,901,720.

For glass reinforced concrete (GRC), the generally recognized glass content is about 5% by weight with the glass fibers being distributed in an interconnected random matrix.

Other similar and equivalent fibrous materials can be used for the fibrous reinforcing materials within the context of the present invention. For example, the fiber can be made from conventional E glass fiber, (including E glass fiber coated to impart alkali resistance to the glass for example with a polyester coating), AR glass such as described above, aramid fibers, nylon fibers, polyester fibers and the like including natural and synthetic inorganic and organic fibers, for example, graphite fibers.

The cementitious material is preferably common cement in admixture with conventional fillers such as sand or pumice and can contain conventional additives such as lime and stearates for water resistance, latex for added strength and wetting ability with respect to the fiber reinforcement, and water reducing agents such as pozzilith for quick setting. Conventional tints or dyes can be also used to provide the desired coloration. It is also possible to use as a cementitious material, a sulfur based product marketed under the trademark CUMENT by Chevron Chemical Company. This sulfur based material can be used in admixture with sand or other conventional fillers following known techniques for handling this type of material.

What is claimed is:

1. An apparatus for incorporating a substantially uniform distribution of glass fibers onto a forming bed of wet cementitious material, the apparatus comprising: a bed of wet cementitious material; means receptive of a multiplicity of continuous strands of glass fibers for chopping same into desired lengths; hood means downstream of the chopping means and receptive of glass fibers dropped therein for dispersing same to form a random uniform matrix and uniformly distributing same along a desired width of the bed, comprising means defining a first chamber for receiving chopped glass fibers dropped into the hood means, means defining a second chamber in communication with said first chamber and downstream thereof for dispersing the glass fibers received from the first chamber to effect the random uniform matrix thereof along the width of the bed and including means for creating a turbulence therein, and means defining a third chamber having an adjustable length elongated outlet aperture extending across a desired width of the bed and disposed downstream of the second chamber and receptive of the dispersed glass fibers in the random uniform matrix to substantially isolate the fibers therein from the turbulence in the second chamber; means mounting the hood and chopping means above the bed for movement relative thereto along the length of the bed for substantially uniformly distributing the glass fibers therein on the desired width of the bed by dropping same through the aperture during relative movement along the length of the bed; and means for distributing the uniform distribution of fibers in a random uniform matrix within the cementitious material.

2. An apparatus according to claim 1, wherein said first chamber has a width substantially greater than that of said outlet aperture and a length substantially smaller than that of said outlet aperture.

3. An apparatus according to claim 2, wherein said second chamber includes a first portion connected to the first chamber and a second portion connecting the first portion to said third chamber and having a trapezoidal cross-section with the longer base downstream of the shorter base.

4. An apparatus according to claim 3, wherein said means for creating a turbulence includes air spray nozzles disposed in said first and second portions of said second chamber and receptive of a source of pressurized air for spraying generally downwardly into the second chamber.

5. An apparatus according to claim 4, wherein said means for creating a turbulence comprises means mounting the spray nozzles for swiveling movement to effect an adjustment of the turbulence.

* * * * *